United States Patent
Thompson et al.

(10) Patent No.: US 6,535,975 B1
(45) Date of Patent: Mar. 18, 2003

(54) SYSTEM CONFIGURATION FOR MULTIPLE COMPONENT APPLICATION BY ASSERTING REPEATEDLY PREDETERMINED STATE FROM INITIATOR WITHOUT ANY CONTROL, AND CONFIGURATION ENGINE CAUSES COMPONENT TO MOVE TO PREDETERMINED STATE

(75) Inventors: Dean R. Thompson, Fort Collins, CO (US); Patrick Goldsack, Bristol (GB); Graham S. Pollock, Cupertino, CA (US); Joseph S. Sventek, Edinburgh (GB)

(73) Assignee: Agilent Technologies, Inc., Palo Alto, CA (US)

( * ) Notice: Subject to any disclaimer, the term of this patent is extended or adjusted under 35 U.S.C. 154(b) by 0 days.

(21) Appl. No.: 09/417,375

(22) Filed: Oct. 13, 1999

(51) Int. Cl.$^7$ .............................................. G06F 15/82
(52) U.S. Cl. ........................ 713/1; 707/104; 707/103; 707/201; 707/203; 709/105; 709/106; 705/105; 705/106; 717/11
(58) Field of Search ............................. 707/104.1, 103; 707/201–203; 709/105, 106; 717/11; 705/105, 106; 713/1

(56) References Cited

U.S. PATENT DOCUMENTS 5,778,368 A * 7/1998 Hogan et al. ................. 707/10
5,970,472 A * 10/1999 Allsop et al. ................. 705/26
5,991,794 A * 11/1999 Hodges et al. ............... 709/107
6,263,213 B1 * 7/2001 Kovacs ........................ 455/550
6,272,390 B1 * 8/2001 Skovgaard ................... 700/103
6,343,263 B1 * 1/2002 Nichols et al. .............. 702/189

* cited by examiner

Primary Examiner—Dennis M. Butler
Assistant Examiner—Nitin Patel
(74) Attorney, Agent, or Firm—Thomas X. Li

(57) ABSTRACT

A configuration system for an application having a plurality of application components is described. The configuration system includes a configuration oracle/initiator that repeatedly asserts a desired state to the application components to operate in that desired state. The desired state is a predetermined state. The configuration oracle only asserts the desired state to the application components and does not control the manner in which each of the application components moves to the desired state. The configuration system also includes a configuration engine in each of the application components that causes the corresponding application components to move to the desired state upon receiving the state assertion of the desired state unless the configuration engine determines that the corresponding application component is already in the desired state. A method of configuring an application having a large number of application components is also described.

20 Claims, 11 Drawing Sheets

SYSTEM CONFIGURATION FOR MULTIPLE COMPONENT APPLICATION BY ASSERTING REPEATEDLY PREDETERMINED STATE FROM INITIATOR WITHOUT ANY CONTROL, AND CONFIGURATION ENGINE CAUSES COMPONENT TO MOVE TO PREDETERMINED STATE

BACKGROUND OF THE INVENTION

1. Field of the Invention

The present invention pertains to distributed component-based applications. More particularly, this invention relates to asymptotically configuring multiple application components into a predetermined state in a cost effective, error-proof, and time saving manner.

2. Description of the Related Art

A distributed application environment typically refers to an environment consisting of a number of independently operated computer systems coupled together by networks. The computer systems cooperate to provide computing resources for an application having a number of application components or elements running on the computer systems. Thus, a distributed application is a component-based application.

A component-based application may not necessarily have distributed application components. For example, the components of a component-based application may be co-located in or run by a single computer system. No matter whether the components are distributed or co-located, a component-based application typically depends on an explicit ordering for affecting its life-cycle operations (e.g., start-up, shutdown, etc.). The life-cycle operations are typically captured as scripts that contain explicit ordering. They are sometimes driven from detailed models that capture detailed dependencies.

In some cases, the scripts initiate a state transition on a component, test for completion of the notification (explicitly or implicitly) and then move on to the next step. This means that the scripts can move the application from one state to another by moving all of the components of the application from one state to the next state (i.e., state transition) in a sequential and centrally-controlled manner. In other cases, timed waits are employed for determining when to move onto the next step. The timed waits, however, take longer time than necessary which slow down the whole configuration process.

One disadvantage associated with using scripts is that the effect in either of the above situations is to serialize activities (i.e., sequential fashion), multiplying the total time for the state change as the number of components increases. Another disadvantage is that the scripts cause the state transition in a centrally-controlled manner because the scripts control when and how the state transition of a component is initiated and when the next step is performed. Another disadvantage is the dependency. The scripts have to receive the state transition completion notification of a component before moving onto the next step. These disadvantages become even more obvious as the number of application components increases.

One prior solution is to inject explicit parallelism into the scripts. This can significantly improve the speed of application state transitions. However, it also increases the complexity of the scripts, resulting in high implementation cost. This consequently increases the time of developing the scripts and the probability of errors in developing the scripts.

Another problem associated with the use of scripts (regardless of parallelism) is that the scripts typically deal poorly with error conditions. The error conditions may include failure of a component and improper state transition, etc. Since the actions or operations contained in the scripts are explicit, each potential error condition must be dealt with explicitly. As the size and complexity of the application increase, the complexity of these scripts tend to increase more rapidly (sometimes exponentially), greatly increasing the probability of an unrecoverable error. Consequently, the application becomes less resilient to partial failures even as the potential for partial failures increases.

When a state transition is initiated, the various components that make up the system will often need to fetch configuration information from repository (e.g., database) in order to act on the transaction. With a very large application (i.e., application having a very large number of components), these accesses are often either serialized or performed in parallel. The serialized accesses stretch the time needed to complete the entire transition. The parallel accesses tend to overload the repository, resulting in increased response time and potential timeout failures.

SUMMARY OF THE INVENTION

One feature of the present invention is to allow state transition of an application having a large number of application components.

Another feature of the present invention is to allow state and/or configuration change of an application having a large number of application components in a cost effective and time saving manner.

A further feature of the present invention is to allow state and/or configuration change of an application having a large number of application components regardless of any component failures or errors.

A still further feature of the present invention is to allow asymptotic and automatic state and/or configuration change of an application having a large number of application components.

A still further feature of the present invention is to use randomization in time and space or randomization in time and distribution in space to achieve balanced accesses to an information store by a large number of application components of an application.

A configuration system for an application having a plurality of application components is described. The configuration system includes a configuration oracle/initiator that repeatedly asserts a desired state to the application components to operate in that desired state. The desired state is a predetermined state. The configuration oracle only asserts the desired state to the application components and does not control the manner in which each of the application components moves to the desired state. The configuration system also includes a configuration engine in each of the application components that causes the corresponding application components to move to the desired state upon receiving the state assertion of the desired state unless the configuration engine determines that the corresponding application component is already in the desired state.

A method of configuring an application having a plurality of application components is also described. The method includes the step of repeatedly asserting a desired state to the application components to cause the application components to operate in the desired state from a configuration oracle/initiator. The configuration oracle, however, does not control the manner in which each of the application components moves to the desired state. The method further includes the step of using a configuration engine in each of the application components to cause the corresponding application components to move to the desired state upon receiving the asserted desired state unless the configuration engine determines that the corresponding application component is already in the desired state.

A method of balancing accesses to an information store by a plurality of application components of an application includes the step of providing a plurality of storage replicas for the information store. Each of the storage replicas stores the same set of data as the information store. The method also includes the step of generating a random delay (e.g., a bounded random delay) for each of the application components to access the information store. The method may also includes the step of randomly selecting one of the replicas for each of the application components such that none of the replicas is overwhelmed by the accesses from the application components. Alternatively, each of the application components is assigned exclusively to one of the replicas such that accesses to the information store are distributed in space.

Other features and advantages of the present invention will become apparent from the following detailed description, taken in conjunction with the accompanying drawings, illustrating by way of example the invention.

DETAILED DESCRIPTION OF THE INVENTION

Figure 1:
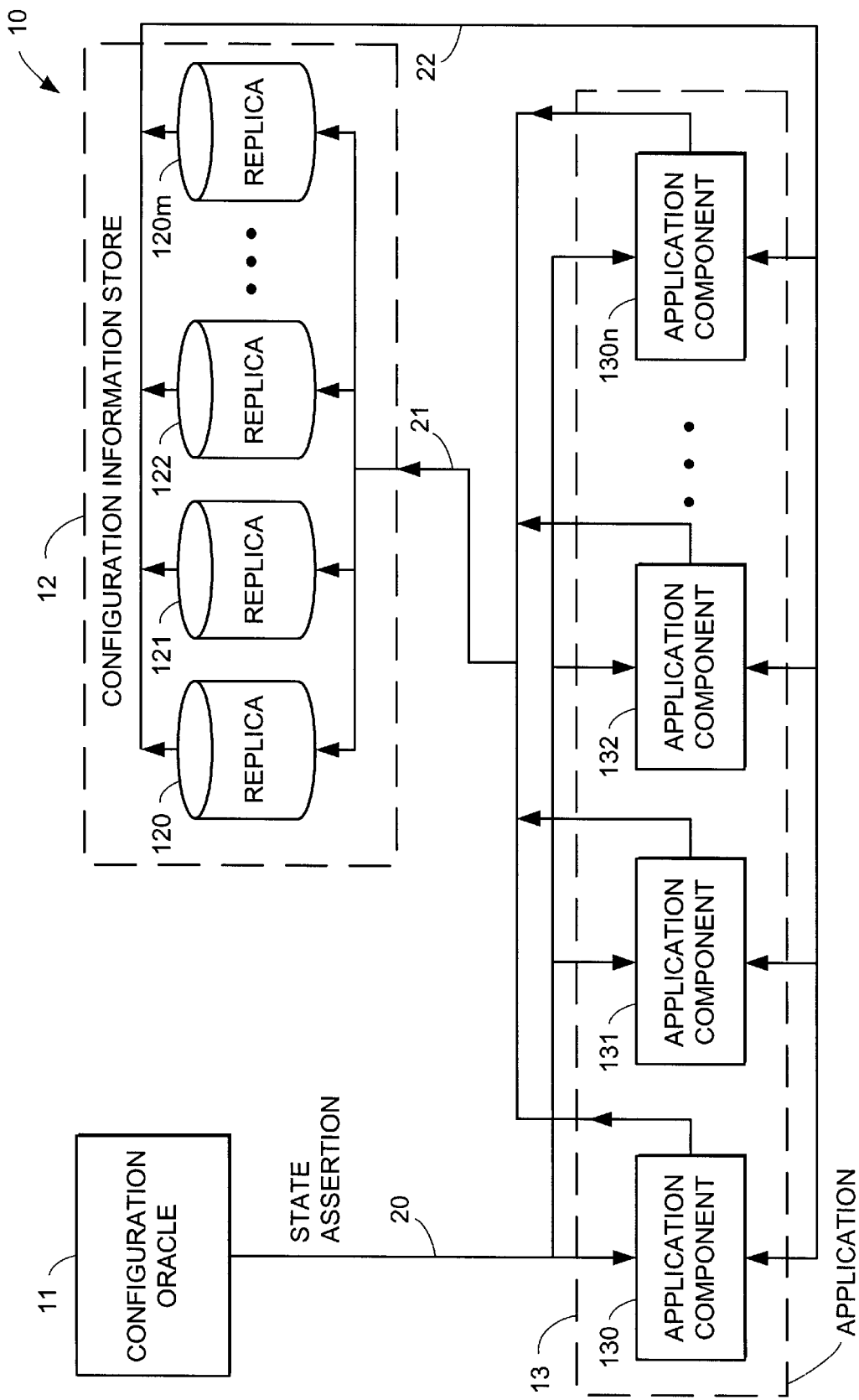
FIG. 1 shows the structure of a configuration system for asymptotically and automatically causing state transition of a component-based application in accordance with the embodiment of the present invention.

FIG. 1 shows an asymptotic configuration system 10 that implements one embodiment of the present invention. As can be seen from FIG. 1, the configuration system 10 causes state transition of an application 13 that includes a number of application components 130 through 130n. This means that the configuration system 10 causes the application components 130–130n to move into a predetermined "desired" state during operation of the application 13. The configuration system 10 includes a configuration oracle 11 and a configuration information store 12. The configuration oracle 11 can also be referred to as configuration initiator. In addition, the configuration system 10 includes a configuration core or module 201 (shown in FIG. 2) in each of the application components 130–130n.

In accordance with one embodiment of the present invention, the configuration system 10 asymptotically and automatically controls state transitions of the application components 130 through 130n. The configuration system 10 allows maximum parallelism in changing the state of the application components 130–130n of the application 13 (thus changing the behavior of the application components 130–130n) by (1) only asserting a desired state from the configuration oracle 11 to the application components 130–130n and (2) allowing the configuration core in each of the application components 130–130n to individually move its corresponding application component into the asserted state without any external control or interference. The configuration system 10 scales or adapts very well to an application having a very large number of application components or very few number of application components in a cost effective and time saving manner.

In addition, the configuration system 10 causes state transition of the application 13 regardless of any component failures or errors among the components 130–130n of the application 13. Moreover, because of the repeated assertion of the desired state by the configuration oracle 11, the configuration system 10 allows self-healing for transient failures (e.g., when a failed component restarts) among the application components 130–130n. Furthermore, randomization is employed to ensure that the information store 12 is not overwhelmed by the accesses of the application components 130–130n at any given time.

As will be described in more detail below, the configuration oracle 11 repeatedly asserts a desired state to all of the application components 130–130n. The state assertion indicates a predetermined "desired state" in which all of the application components 130–130n should move or operate. The configuration oracle 11 only asserts the desired state and does not control the actual state transition of each of the application components 130–130n. This means that the configuration oracle 11 does not control the manner in which each of the application components 130–130n moves to the desired state. The actual state transition is made by the configuration core 201 (FIG. 2) in each of the application components 130–130n without control or involvement of the configuration oracle 11.

The configuration core 201, when receiving a state assertion of the desired state, first determines whether its corresponding application component is already in the desired state upon receiving the state assertion. If not, the configuration core 201 causes the corresponding application component to move into the desired state without control or involvement of the configuration oracle 11. The configuration core 201 may or may not inform the configuration oracle 11 when the state transition of the corresponding application component is complete.

In one embodiment, the configuration core 201 does not inform the configuration oracle 11 when the state transition of the corresponding application component is complete. In other words, the state transition of the application components 130–130n is not centrally controlled by the configuration oracle 11. This allows maximum parallelism in changing the behavior/state of the application components 130–130n. This also allows the state transition of the application components 130–130n to be carried out regardless of any component failures or errors among the components 130–130n. Moreover, this allows a relatively large application to move to an "operable" state relatively quickly.

Alternatively, the configuration core 201 informs the configuration oracle 11 when the state transition is complete. In this case, the overall health of the application 13 can be ascertained and acted on. Moreover, the information that the state transition is completed can be obtained by the configuration oracle 11 by polling the configuration core 201 in each of the application components 130–130n.

The implication of the configuration system 10 is that once a new desired state is asserted by the configuration oracle 11, the total number of application components whose behavior reflects that state will gradually increase until an equilibrium is established. The number of the application components behaving "correctly" may be less than the total number of application components. Therefore, the approach to completion is asymptotic in nature.

Because the configuration oracle 11 continues to repeat the assertion of the "desired state" on a regular basis, transient failures are self-healed. This means that if a component fails during the first assertions and later restarts, that component will automatically pick up the "desired state" and act accordingly, without the need for special logic.

Figure 2:
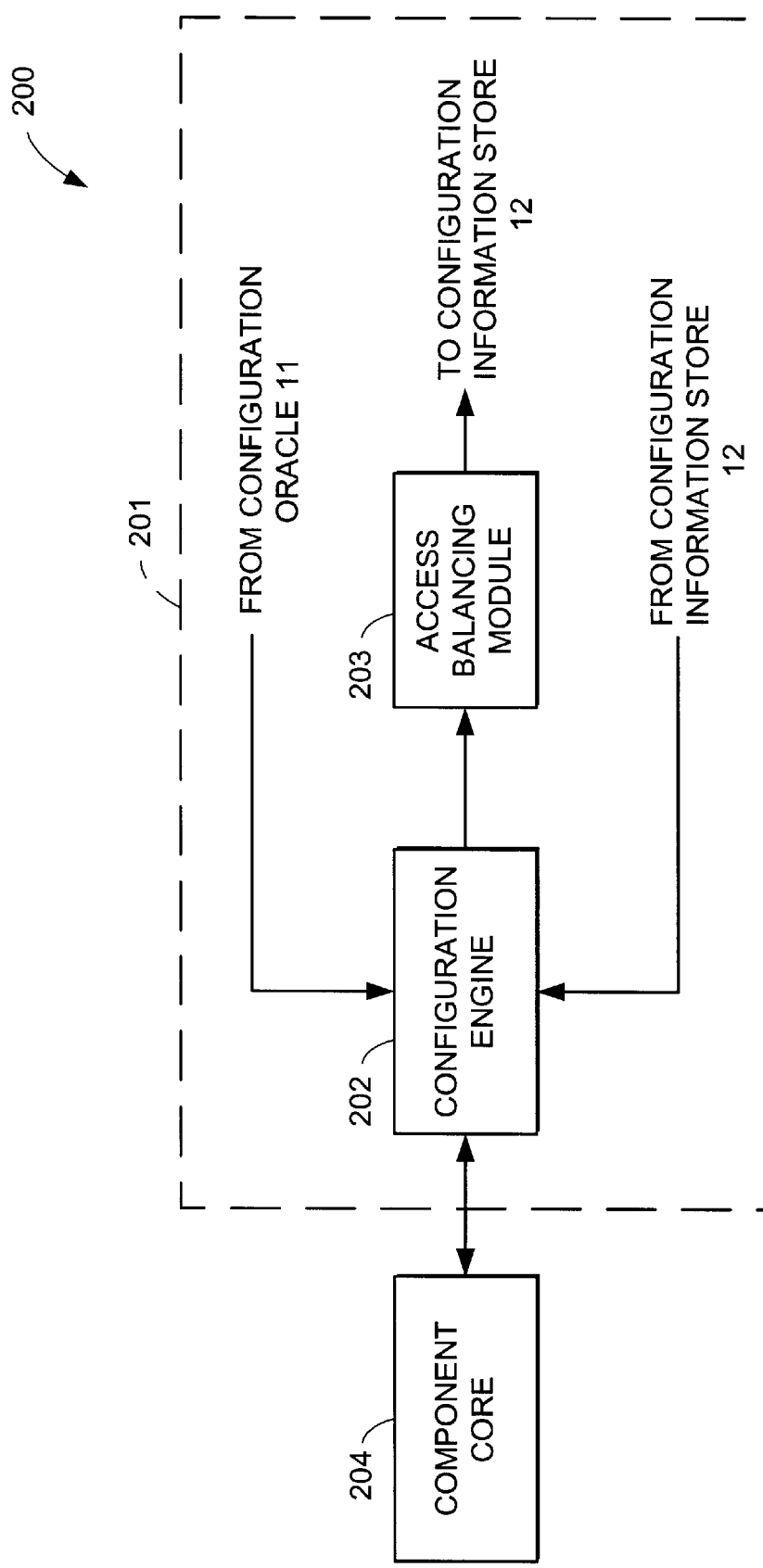
FIG. 2 shows the structure of each of the application component of the configuration system of FIG. 1.

Each of the application components 130–130n also includes an access balancing module in the configuration core (e.g., the access balancing module 203 in FIG. 2). The access balancing module 203 first generates a random delay for the configuration engine in the corresponding application component to access a remote configuration information store 12 for the configuration information. In one embodiment, the random delay is a bounded random delay for each application component. In one embodiment, the access balancing module 203 also causes the configuration engine in the corresponding application component to randomly select one of a number of replicas of the information store 12 for configuration information access such that none of the replicas 120–120m is overwhelmed by the accesses from the application components 130–130n at any given time. This also allows the configuration system 10 to scale very well to extremely large number of application components or very few number of application components in a cost effective and time saving manner. Alternatively, each of the application components 130–130n is assigned exclusively to one of the replicas 120–120m. In this case, accesses to the information store 12 are distributed in space. The configuration system 10 will be described in more detail below, also in conjunction with FIGS. 1–11.

Referring to FIG. 1, the application 13 is a component-based software application which includes a number of application components 130–130n. In fact, the application 13 can be any kind of component-based application or component-based hardware/firmware system. Each of the application components 130–130n is an element of the application 13, and performs one or more designated functions for the application 13. Each of the application components 130–130n can go from one state to another state. For example, the application components 130–130n can go from a startup state to an operation state, from the operation state to a shutdown state, or from an operation state to a measurement state. The measurement state can mean that the application components 130–130n need to additionally collect or provide data for system performance measurement during the operation of the application 13. When in a particular application state, an application component behaves in an application specified manner.

The application components 130–130n can be distributed to operate among a number of computer or data processing systems (not shown) connected together by networks (not shown). The computer systems can be of any kinds of known computer systems. The application components 130–130n can also be co-located in and executed by a single computer system.

In one embodiment, each of the application components 130–130n is resilient in the face of non-performance of another one of the application components 130–130n, making each application component operationally independent of each other. This also makes failure handing for a component localized to those elements that interact with the failed component. In addition, the independency of the application components 130–130n keeps the application 13 functioning despite the failures. Alternatively, each of the application components 130–130n is not independent of each other. FIG. 2 shows the structure of an application component 200 which can be any one of the application components 130–130n.

Referring to FIG. 2, the application component 200 includes a component core 204 and the configuration core 201. The component core 204 performs the designated function or functions of the application component 200. The structure of the component core 204 is known and varies in accordance with the designated functions. Thus, the component core 204 will not be described in more detail below. The component core 204 also informs the configuration core 201 of its current state. The configuration core 201 is part of the configuration system 10, which will be described in more detail below.

As can be seen from FIGS. 1 and 2, the configuration system 10 includes the configuration oracle 11, the configuration core (e.g., 201) in each of the application configuration components 130–130n, and the configuration information store 12. The configuration oracle 11 is connected to the application components 130–130n via a communication channel or infrastructure 20.

In one embodiment, the communication channel 20 is a point to multi-point (i.e., broadcasting) communication channel, where a single assertion by the configuration oracle 11 can be simultaneously received by multiple recipients. In this case, if a new recipient comes into existence, it will receive the assertions without requiring knowledge of it by the oracle 11. It also allows the recipients to act in parallel after receiving an assertion. In another embodiment, the communication channel 20 is a publish/subscribe communication channel. In this embodiment, the application components 130–130n need to subscribe to the communication channel 20 in order to receive the state assertion. The application components 130–130n do not need to know where the state assertion is coming from. The configuration oracle 11 is only publishing the state assertion to the communication channel 20 and does not know how many application components the application 13 has. Alternatively, the communication channel 20 can be other types of known communication medium.

The communication channel 20 does not have to provide reliable delivery of assertions. Since the oracle 11 periodically repeats its current assertions, a lost assertion to an application component will probably be picked up on the next assertion and there are no implications of interconnectedness between the transitions of the various receiving application components. This is beneficial because unreliable mechanisms are often more efficient (in performance and resource consumption) than reliable ones.

The configuration oracle 11 functions as the authority on what is the "correct" behavior/state of the application 13 at all times. It influences the behavior of the application 13 by periodically asserting the correct or desired state to the application components 130–130n of the application 13. Thus, the configuration oracle 11 can also be referred to as configuration manager or initiator. The configuration oracle 11 can be implemented as a software, hardware, or firmware module using known means.

The functions performed by the configuration oracle 11 include the function of determining which state the application components 130–130n should be in. The configuration oracle 11 can perform this function by receiving a command from an external source (not shown), indicating the desired state for the application components 130–130n. The configuration oracle 11 may or may not keep a record of the overall current state of the application 13. This will be described below.

In the embodiment in which the configuration oracle 11 can access the information of state transition for all of the application components, the configuration oracle 11 also keeps a record of the overall current state of the application 13. In this case, two methods can be employed. The first approach has each application component make its current state available to the configuration oracle 11 by either a push or pull mechanism. Under the second approach, each application component "tags" its output data with the configuration it was produced in. In addition, the configuration oracle 11 subscribes to these data channels and effectively derives the state of a component by looking at the tagged state.

A fully qualified state assertion from the oracle 11 may consist of a series of fully qualified state declarations. Each fully qualified state declaration consists of:

1 The "desired state" of the application (e.g., halted, quiescent, running, etc.).
2 A handle to the data that an application component will need to reach the desired state (i.e., the configuration). This may be the data itself or, more commonly, a unique key that a receiving application component may use to obtain the correct data.
3 The time at which the application 13 should be in the specific state.
4 The earliest time at which the application should begin to act on the declaration (i.e., begin to change its behavior).
5 The earliest time at which an application component can begin to obtain its configuration.

Various degenerate cases are possible, in which case the value of one or more of these values is implied by local policy. The following are a few examples.

Example 1:
State: running
Configuration Handle: configuration_5.
In this example, the application should be running using "configuration_5" effective immediately.

Example 2:
State: halted
Completion Time: 1700 Jan. 15, 1999.
In this case, the application should be stopped at the specified time (i.e., 5:00 PM on Jan. 15, 1999).

Example 3:
State: running
Completion Time: 1200 Jan. 15, 1999
Configuration Handle: configuration_6.
State: running
Completion Time: 0600 Jan. 16, 1999
Configuration Handle: configuration_4.

In this case, the application should be running using configuration_6 at noon on Jan. 15, 1999 and running using configuration_4 at 6:00 AM on Jan. 16, 1999. In all cases, the oracle 11 asserts the desired behavior (i.e., operational state) of the application in absolute terms. It is up to the receiving application components of the application to individually determine what action or sequence of actions it needs to take to conform to the asserted behavior/state.

Once the application components 130–130n receive the desired state assertions, the configuration core in each of the application components 130–130n will make a "best effort" to move the corresponding application component into the desired state in accordance with the state assertion. In this case, each of the application components 130–130n must be construed in such a way as to behave gracefully or normally when the other components of the application 13 are not yet moved to the desired state and behaving according to the state assertion.

The configuration core in each of the application components 130–130n, upon receiving the state assertions, needs to perform several actions. First, the configuration core needs to determine whether the corresponding component is currently compliant with the state assertion received (i.e., whether the corresponding component is in the asserted state, using the correct context, etc.). If the answer is yes, no additional action is required.

If the corresponding component is, however, not fully compliant with the state assertion, the configuration core of that component needs to determine what actions it must take in order to behave consistent with the assertion. This may involve changing current state or preparing to take action to change the state at some time in the future. The configuration core in each of the application components 130–130n is shown in FIG. 2 and will be described in more detail below.

Referring back to FIG. 1, the configuration information store 12 is used to store all the configuration information necessary for completion of all the state transitions for all of the components 130–130n. This means that the configuration information store 12 stores all the configuration information for each of the states that the application components 130–130n may be in. This means that the information store 12 is a database, storing the necessary configuration information for each of the states that the application components 130–130n may move into. The configuration information is state-specific and component-specific. This means that the asserted state "B" to a particular application component may mean a set of parameters while the same state "B" to another application component may mean a set of operations. The information store 12 stores all the configuration information for all possible states for all components of the application 13.

The configuration information store 12 includes a number of replicas 120 through 120m, each storing the same configuration data of the configuration information store 12. This means that the configuration information store 12 includes a number of identical databases, each storing identical data. When an update occurs to one of the replicas 120–120m, the same update applies equally to all other replicas.

The configuration information store 12 is connected to the application components 130–130n via communication channel or bus 21. As can be seen from FIG. 2, the configuration information store 12 is connected to the configuration core 201 via a communication channel or bus 21. The communication channel or bus 21 can be implemented using any known technology.

The configuration core 201 of FIG. 2 includes a configuration engine 202 and an access balancing module 203. The configuration engine 202 is responsible for the state transition of the component 200 in response to the state assertion from the configuration oracle 11. The configuration engine 202 is responsible for receiving the state assertion from the configuration core 11 (FIG. 1) and interpreting the assertion with respect to the internal state of the component core 204 of the component 200. If the configuration engine 202 determines that the internal state of the component core 204 is the asserted state, the configuration engine 202 ignores the state assertion and does nothing. If the configuration engine 202 determines that the internal state of the component core 204 is not the asserted state, the state transition is needed and the configuration engine 202 will make a "best effort" to initiate and complete the state transition. The configuration engine 202 can be implemented using known technology in the form of software, hardware, or firmware.

When the configuration engine 202 determines that the corresponding component 200 needs to take action in response to the received state assertion, the configuration engine 202 will derive a number of things from the information described in the state assertion. First, the configuration engine 202 determines (from the configuration handle) whether the corresponding component 200 has the required data for the component to reach the asserted state. If not, the configuration engine 202 must determine where the required data can be fetched. The required data may be fetched from the configuration store 12 (FIG. 1). The required data may also be fetched from another source within the component 200. Thus, the configuration engine 202 needs to determine where the required data may be fetched from and when it should be retrieved. The source of the required data may be contained in (or implied by) the configuration handle in the state assertion. The source may also be determined by local policy, or it may be part of the component's existing configuration. The configuration engine 202 must also choose a time at which the configuration engine 202 begins to make the transition.

Secondly, the configuration engine 202 must determine the sequence of internal state transitions that are required to reach the desired state and configuration. For example, if the component 200 is currently running with one configuration and it needs to run with a different one, the component may need to idle itself and re-activate with the new configuration data.

Thirdly, the configuration engine 202 must determine a time at which the set of internal state transitions required to arrive at the asserted state begins. This may be affected by how long the component 200 expects to take to transition and the time at which the configuration data is available. If the target time has already passed, the configuration engine 202 may choose an arbitrary future time. The configuration engine 202, however, does not make any guarantees to anyone external to the component 200 that it will actually meet any of the target times asserted by the oracle 11 (FIG. 1). In addition, the configuration engine 202 does not perform any action earlier than the times indicated in the assertion (e.g., earliest configuration fetch, earliest start of transition).

Figure 3:
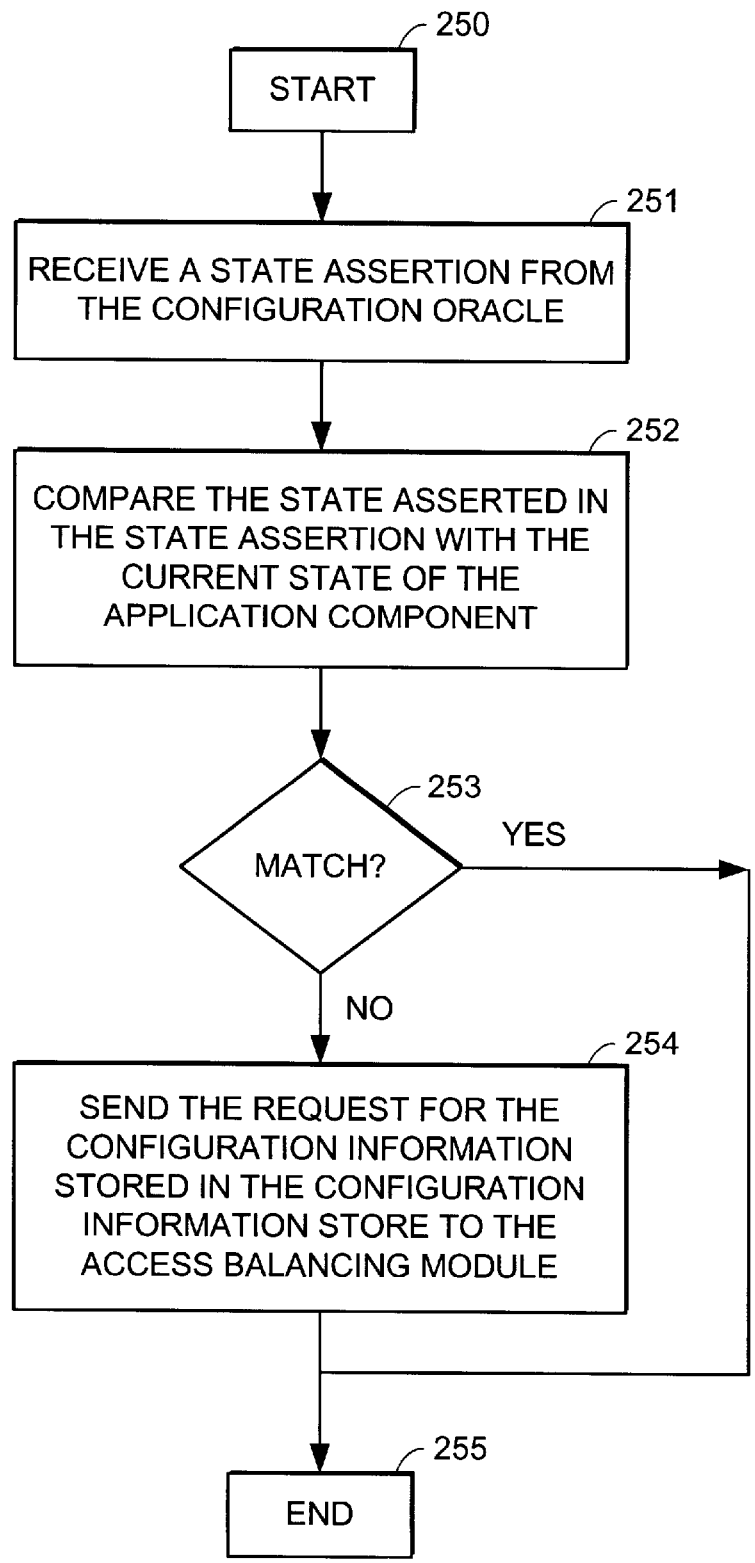
FIG. 3 is a flow chart diagram of the configuration engine of FIG. 2.

When the configuration engine 202 accesses the information store 12 for the required configuration information necessary to complete the state transition, the configuration engine 202 generates an access request and the request is sent to the configuration information store 12 via the access balancing module 203. Once the configuration information is returned from the information store 12, the configuration engine 202 then carries out the requested state transition. FIG. 3 shows in flowchart diagram form the process of the configuration engine 202, which will be described in more detail below.

Referring back to FIG. 2, the access balancing module 203 is used to randomize the access to the information store 12 from the configuration engine 202 of the component 200. This includes random delay of the access to the information store 12 from the configuration engine 202 and random selection of one of the replicas 120–120m for access by the configuration engine 202. By doing this, none of the replicas 120–120m is overwhelmed by the accesses from the application components 130–130n at any given time by the randomization. The access balancing module 203 can be implemented using known technology in the form of software, hardware, or firmware.

Figure 4:
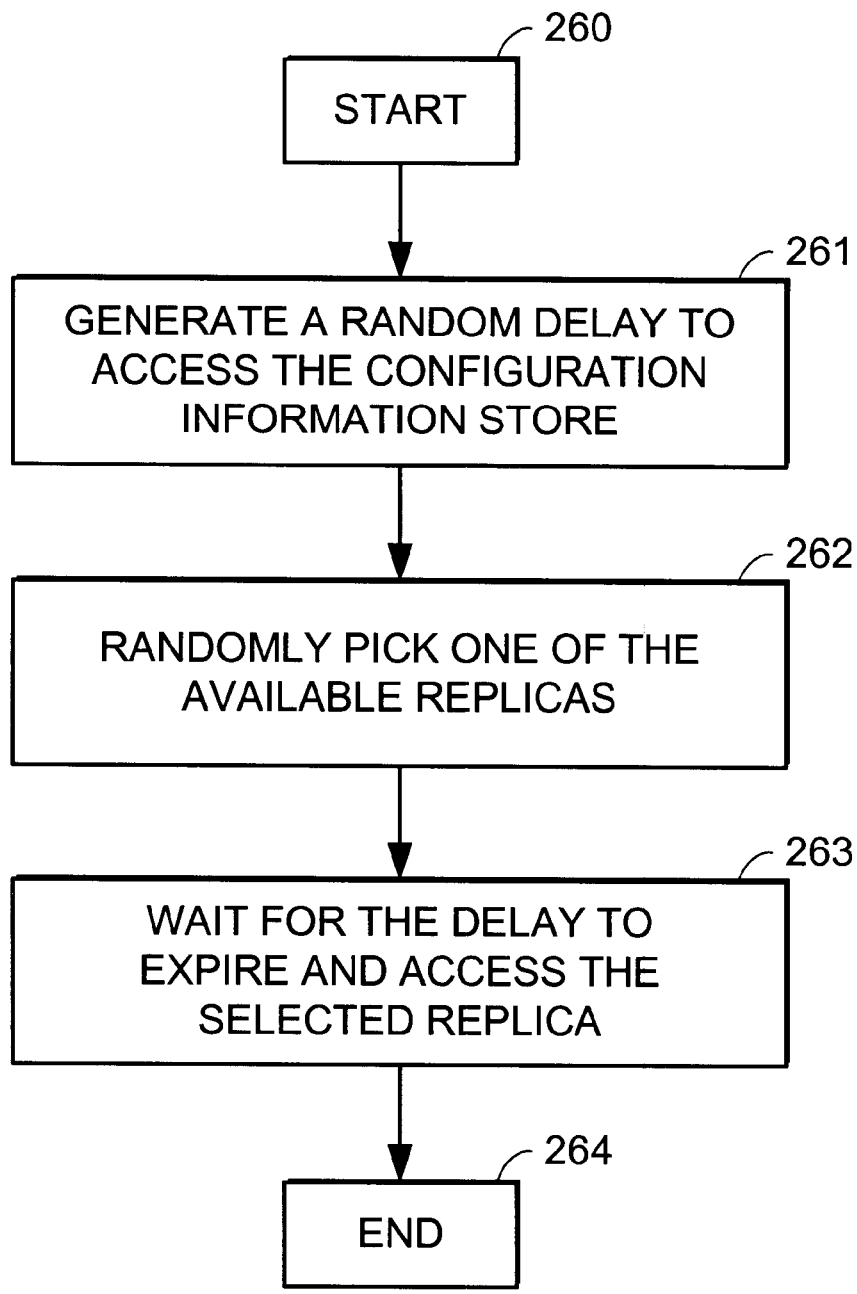
FIG. 4 is a flow chart diagram of the access balancing module of FIG. 2.
Figure 5:
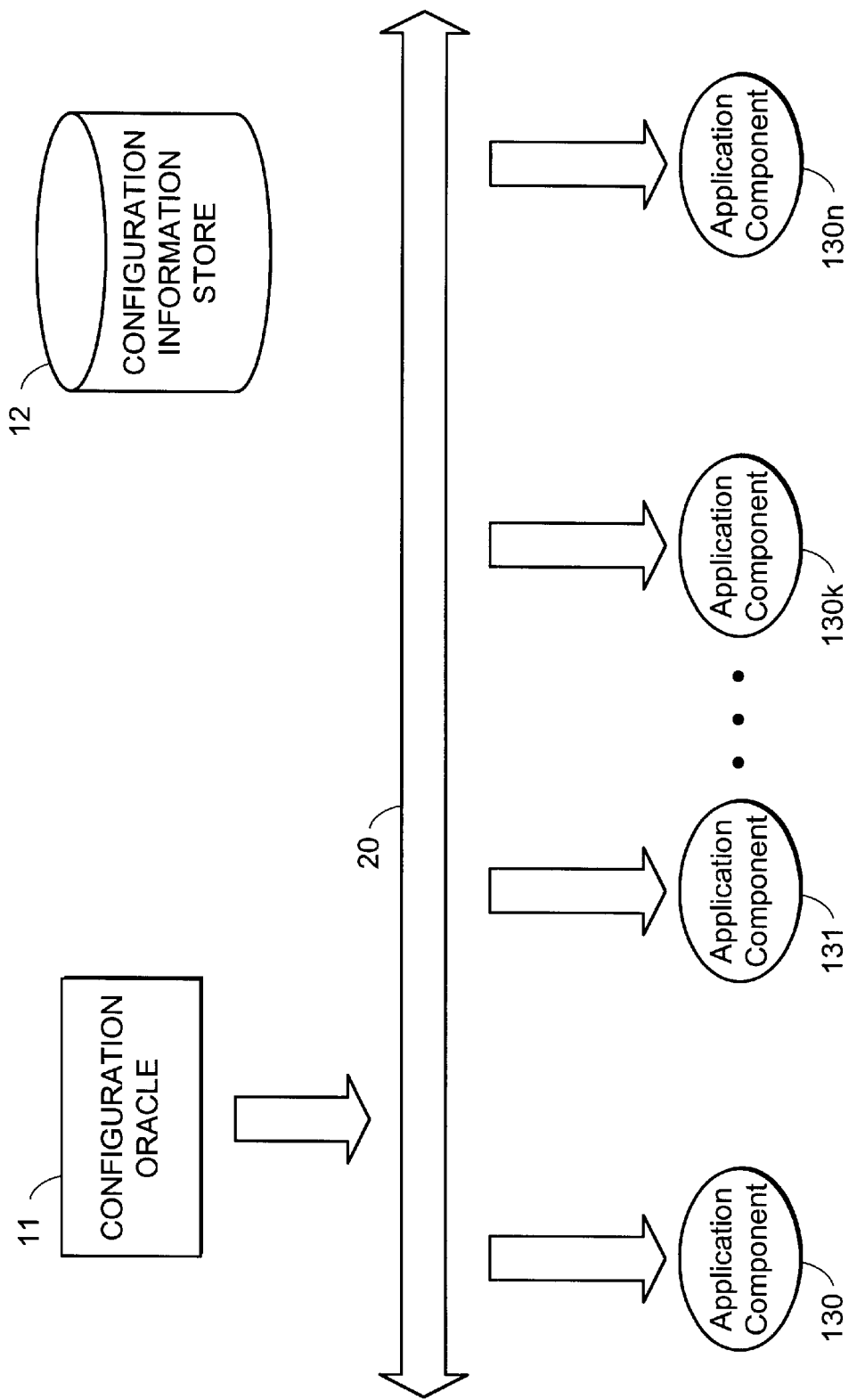
FIGS. 5–7 show the process of state transition of a component-based application performed by the configuration system of FIG. 1.
Figure 6:
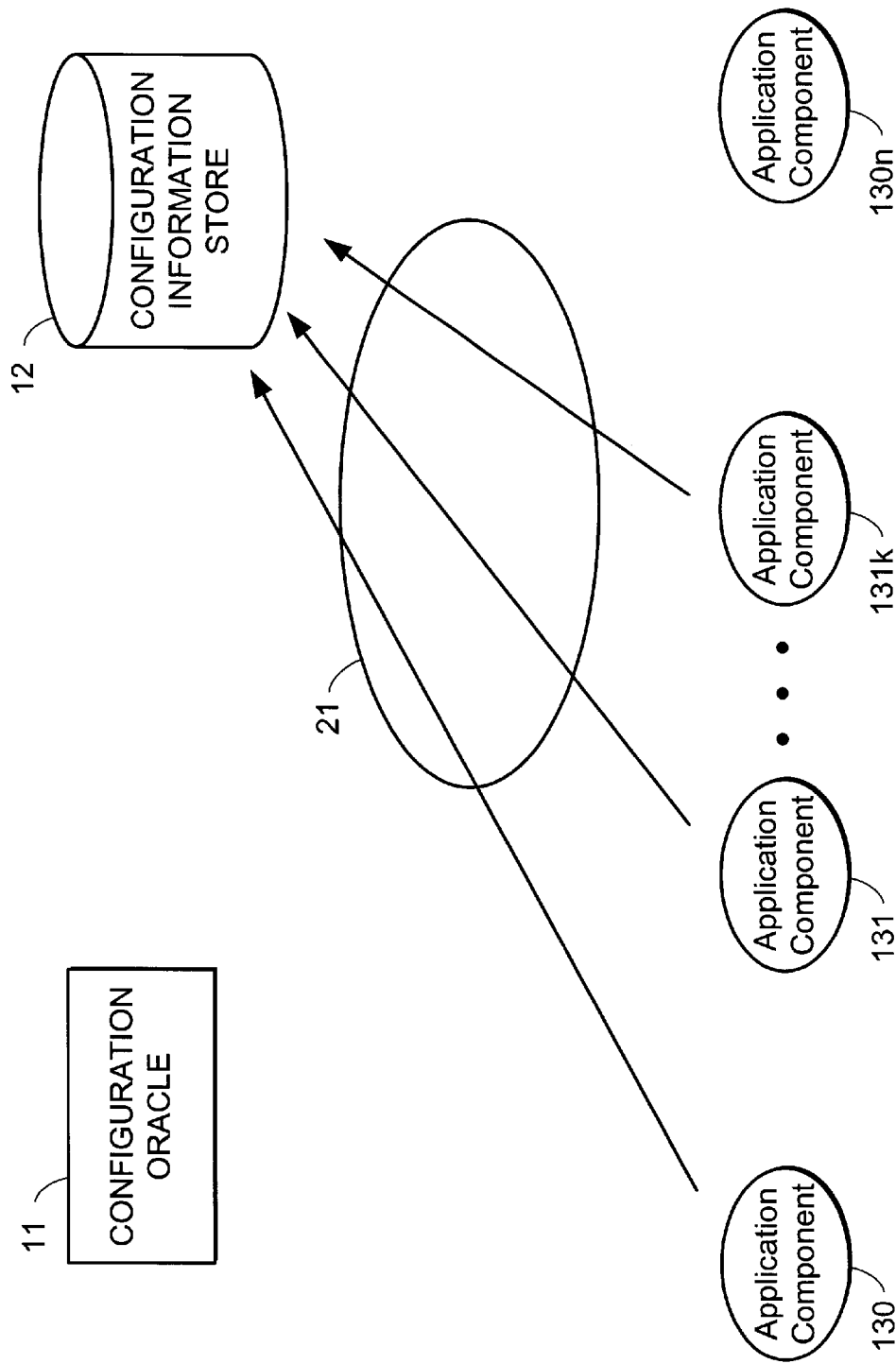
Figure 7:
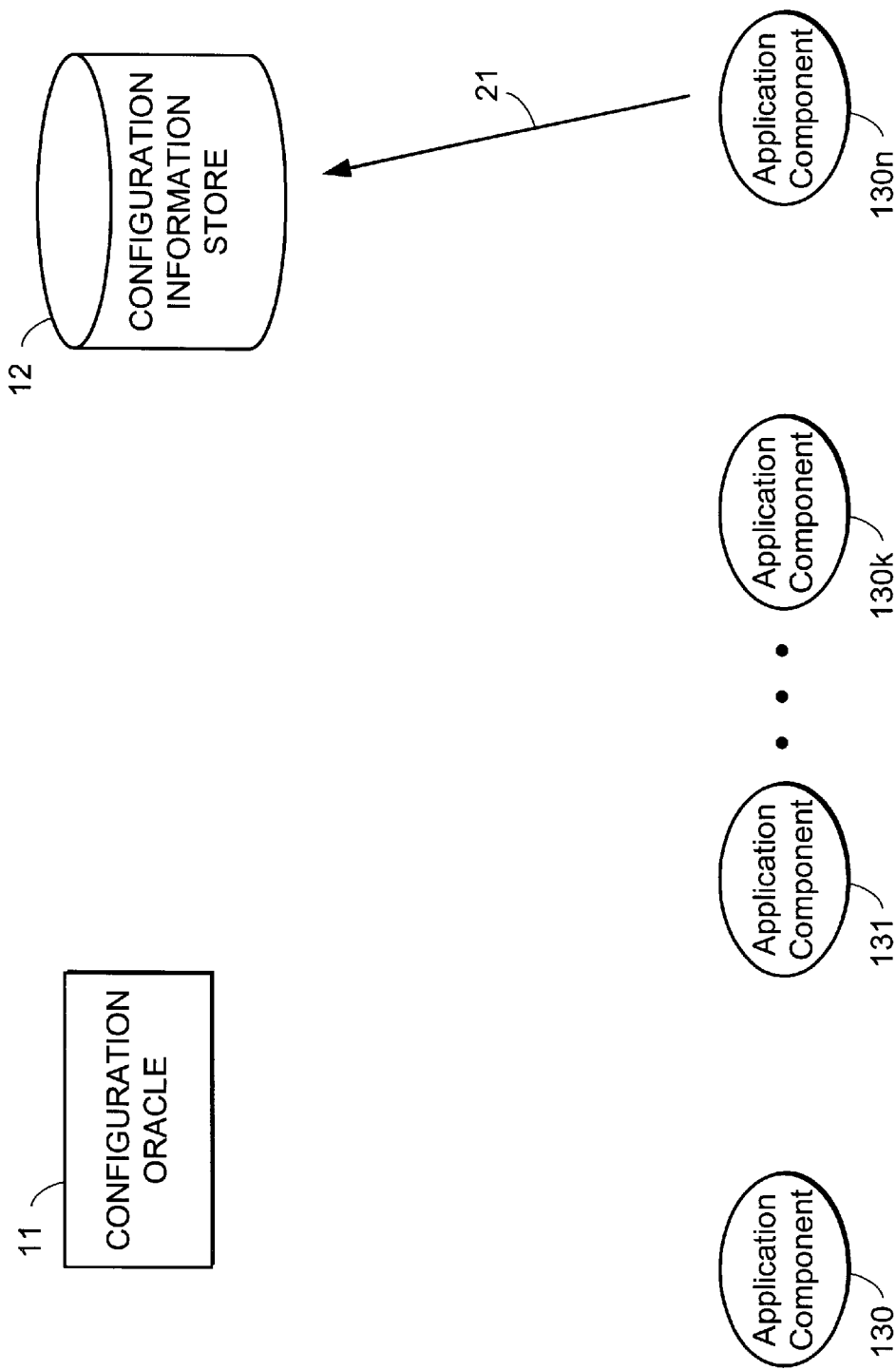

The randomization function of the access balancing module 203 is performed by generating a random delay for the access request from the configuration engine 202. In this case, the random delay may be a bounded random delay for each application component. In addition, the access balancing module 203 randomly selects one of the replicas from the configuration information store 12 for the application component to access. This randomization approach allows accesses to the information store 12 not to overwhelm the information store 12 at any given time. This randomization approach is also referred to randomization in time and space approach. FIG. 4 shows in flowchart diagram form the process of the access balancing module 203 using the randomization in time and space approach, which will be described in more detail below.

Alternatively, the access balancing module 203 does not randomly select one of the replicas from the configuration information store 12. In this case, each of the replicas 120–120n is assigned to one or more of the application components 130–130n locally, and is only loaded with configuration information appropriate for its associated application components. Each of the application components 130–130n can only access its associated replica of the information store 12. In this case, the access balancing approach for the access balancing module 203 is randomization in time and distribution in space.

Referring again to FIGS. 1–2 and 5–7, the operation of the configuration system 10 is now described. The configuration oracle 11 repeatedly asserts the desired state of a desired state to each of the application components 130–130n once the configuration oracle 11 determines that the application components 130–130n should be in a desired state (e.g., "B" state). The configuration oracle 11 asserts the desired state and then repeats the state assertion at a predetermined time interval. The predetermined time interval should be at least equal to the time during which the configuration engine in an application component can complete the state transition of that application component to the desired state. In one embodiment, the configuration oracle 11 repeatedly asserts the same desired state until the configuration oracle 11 determines the application 13 should be in a different state. Alternatively, the configuration oracle 11 may only repeatedly assert the desired state for a finite number of times and stop after the number is reached.

The repeated assertion by the configuration oracle 11 allows the configuration system 10 to be reliable and resilient to errors. As can be seen from FIGS. 5–6, when the configuration oracle 11 first asserts the desired state of the state B, only application components 130–130k respond to the state assertion. The application component 130n responds and changes its state at the next state assertion by the configuration oracle 11 (see FIG. 7).

When a responsive (i.e., not failed) application component receives a state assertion, its configuration engine will make a "best effort" to move the corresponding application component to the desired state. To move the application component to the desired state, configuration information from the information store 12 may be needed and, if so, the configuration engine in the corresponding application component needs to access the information store 12. This causes a problem of overwhelming the information store 12 if there are a large number of application components accessing the information store 12 at the same time, as can be seen from FIG. 6. This is solved by use of the access balancing module in each of the application components 130–130n and the number of replicas in the information store 12 that store the same set of data. The access balancing module in a component generates a random delay for the access request from that component and randomly selects one of the replicas of the information store 12 to be accessed by that access request such that none of the replicas of the information store 12 is not overwhelmed at any given time.

Each of the application components 130–130n should be capable of reporting both its "current state" and its "current configuration". The component may do this explicitly in response to a query, explicitly by periodically publishing it, or implicitly by reporting it in its operational responses and publications.

The configuration oracle 11 of FIG. 1 can then determine the "state" of the application relative to the desired state by placing the components into one or more categories:

Active components in the desired state and in the desired configuration;

Active components in a different state and/or configuration;

Components that should be present but are not active (non-responsive);

Components that are active (responsive) but were not anticipated (not previously known to exist).

The active reporting of state and configuration by components also helps other components to evaluate the "quality" of their interactions with them. For example, a component may choose to discard data reported to it by a component in a different state/configuration. This information may also be used to determine when enough of the application is in the correct state (a quorum) for it to be functional, and thus declared available for use.

It is possible for the configuration oracle 11 of FIG. 1 to assert different "correct" behaviors to different classes of components through use of multiple communication channels. The structure of the information in the assertion does not need to be uniform.

In one alternative embodiment, the configuration oracle 11 of the configuration system 10 can be replaced by one of the application components 130–130n (e.g., the application component 131). In this case, the application component 131 acts both as the configuration oracle and a receiving application component simultaneously. Thus the application 13 can be "tiered" where some components receive assertions from one oracle and forward or re-interpret them across a different communication channel to a different set of receiving components. This allows efficient implementation across wide area geographies, where a different communication channel implementation is desired in the wide area than in the local area. It can also allow bridging of security domains.

In another alternative embodiment, a receiving application component may function as an "agent" for a group of other components. This is useful where there are groups of components that have strict transition ordering dependencies on each other. In this case, the agent receives the assertion from the oracle and interprets it into a more traditional sequential transition graph for the other elements. The "agent" may also choose to report the current state of the group as a whole. Thus, the application as a whole behaves asymptotically while there are islands of stricter transaction ordering within it.

Figure 8:
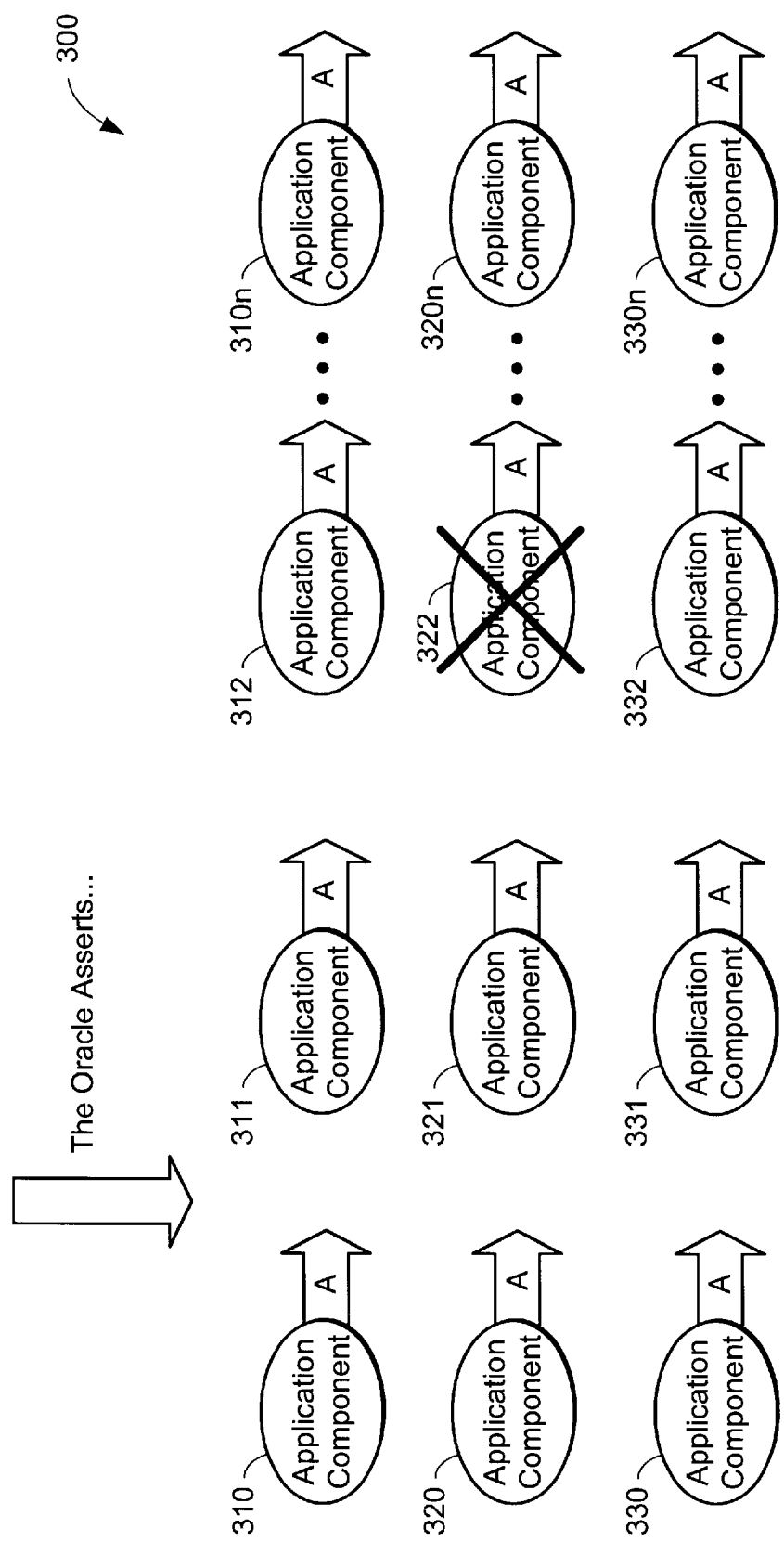
FIGS. 8–10 show the process of state transition of a component-based application performed by the configuration system of FIG. 1, wherein the component-based application includes faulty application components.
Figure 9:
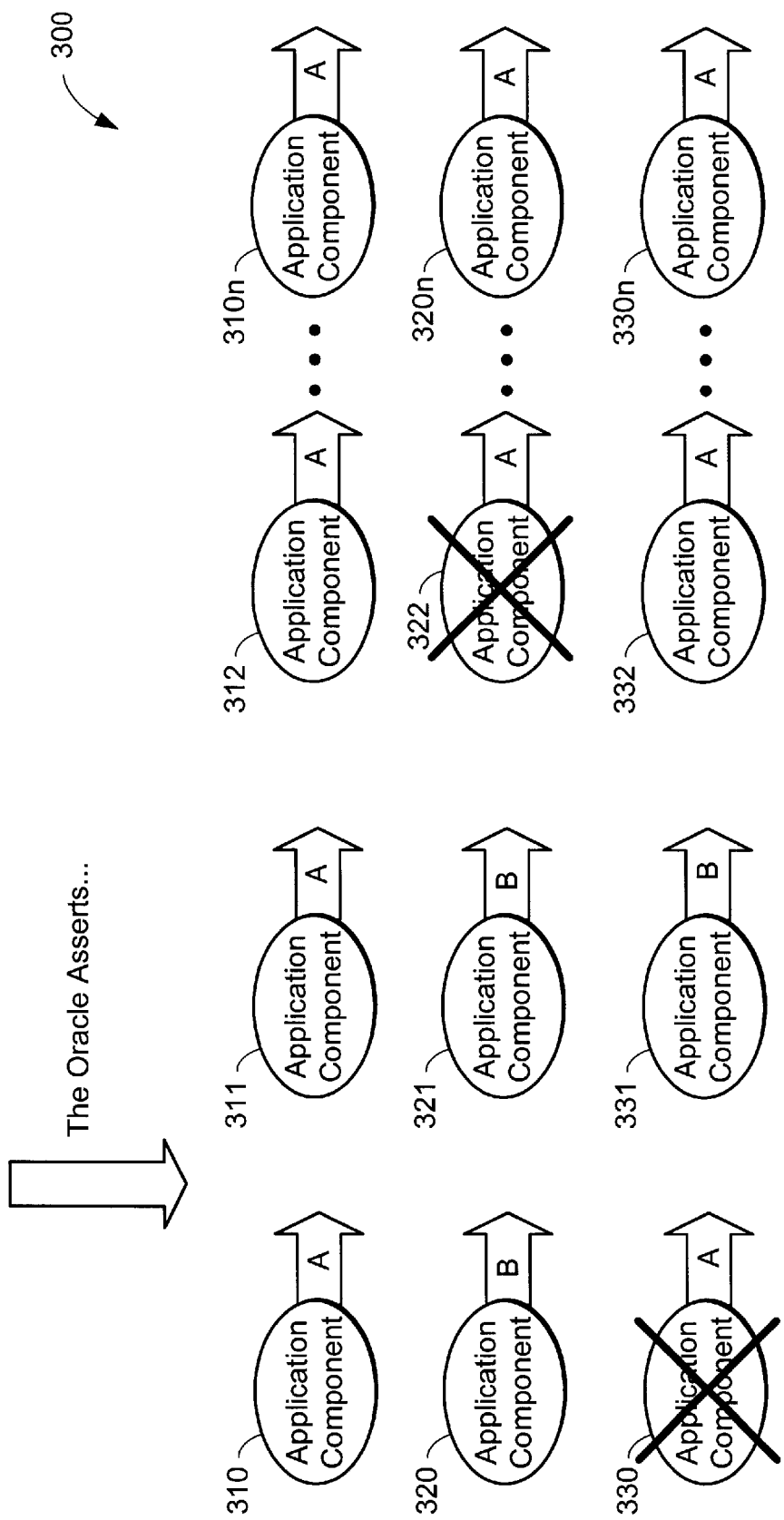
Figure 10:
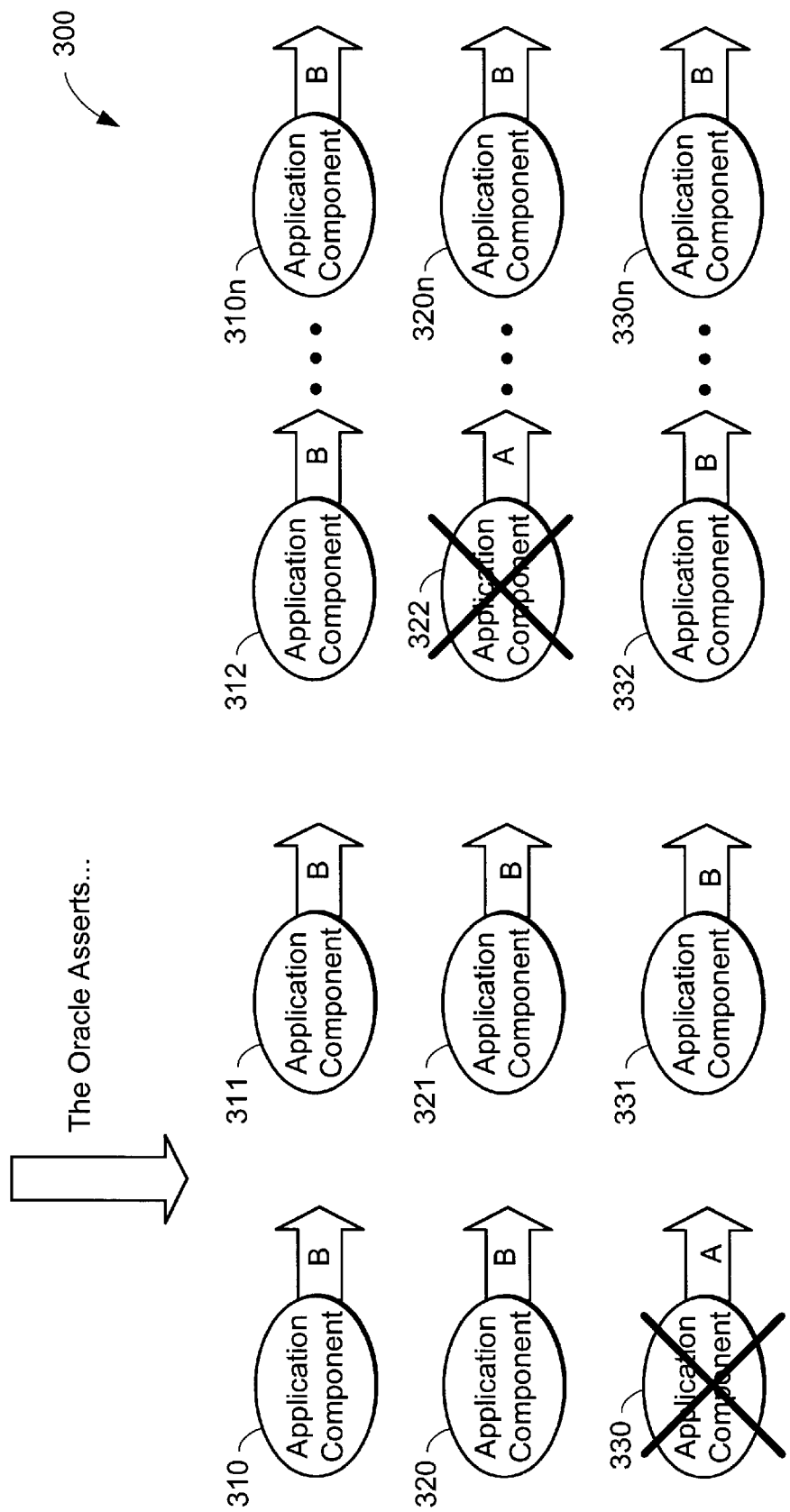

FIGS. 8 through 10 show that the configuration system 10 of FIG. 1 can cause state transition for a component-based application 300 with failed components. In addition, FIGS. 8–10 also shows that the configuration system 10 of FIG. 1 allows any transiently failed application components to be self-healed. As can be seen from FIG. 8, the application 300 is currently at the state "A" when it is instructed to move to the state "B". At this time, the application component 322 is a failed component. In addition, only the application components 320–321 and 331 have moved to the state "B" after the first state assertion (see FIG. 9).

After a delay of a predetermined time has expired, the desired state is repeatedly asserted by the oracle (i.e., the oracle 11 of FIG. 1). This can be seen from FIG. 9. At this time, the application component 322 remains a failed component and will not respond to the repeated state assertion. In addition, the component 330 is also failed. If, however, the application component 322 has come back to operation, it will respond to the repeated state assertion. This is the self-healing, as described above.

As can be seen from FIG. 10, this repeated state assertion causes all of the application components of the application 300 to be moved into the state "B" except the failed components 322 and 330.

Referring to FIG. 3, the process for the configuration engine 202 of FIG. 2 starts at the step 250. At the step 251, the configuration engine receives the state assertion from the configuration oracle 11 (FIG. 1). At the step 252, the desired state is compared with the current state of the application component by the configuration engine 202. This is intended to determine if state transition is needed for the application component. The step 253 is a judgment step to determine if the step 254 should be skipped or not. If it is determined at the step 253 that the current state of the application component matches the asserted state, there is no need to perform the state transition and the step 254 is skipped. If it is determined at the step 253 that the current state does not match the asserted state, the configuration engine 202 then generates and sends a request to the information store 12 via the access balancing module 203 to fetch the necessary configuration information for configuring the application component into the asserted state at the step 254. The process then ends at the step 255.

Referring to FIG. 4, the process of the access balancing module 203 of FIG. 2 starts at the step 260. At the step 261, the module 203 generates a random delay for the access request generated by the configuration engine 202 to access the information store 12 (FIG. 1). At the step 262, the module 203 then randomly selects one of the replicas 120–120m of the information store 12 for access by the access request from the configuration engine 202. At the step 263, the access balancing module 203 waits for the generated random delay to expire before allowing the access request to pass to access the selected replica of the information store 12. The process then ends at the step 264.

Figure 11:
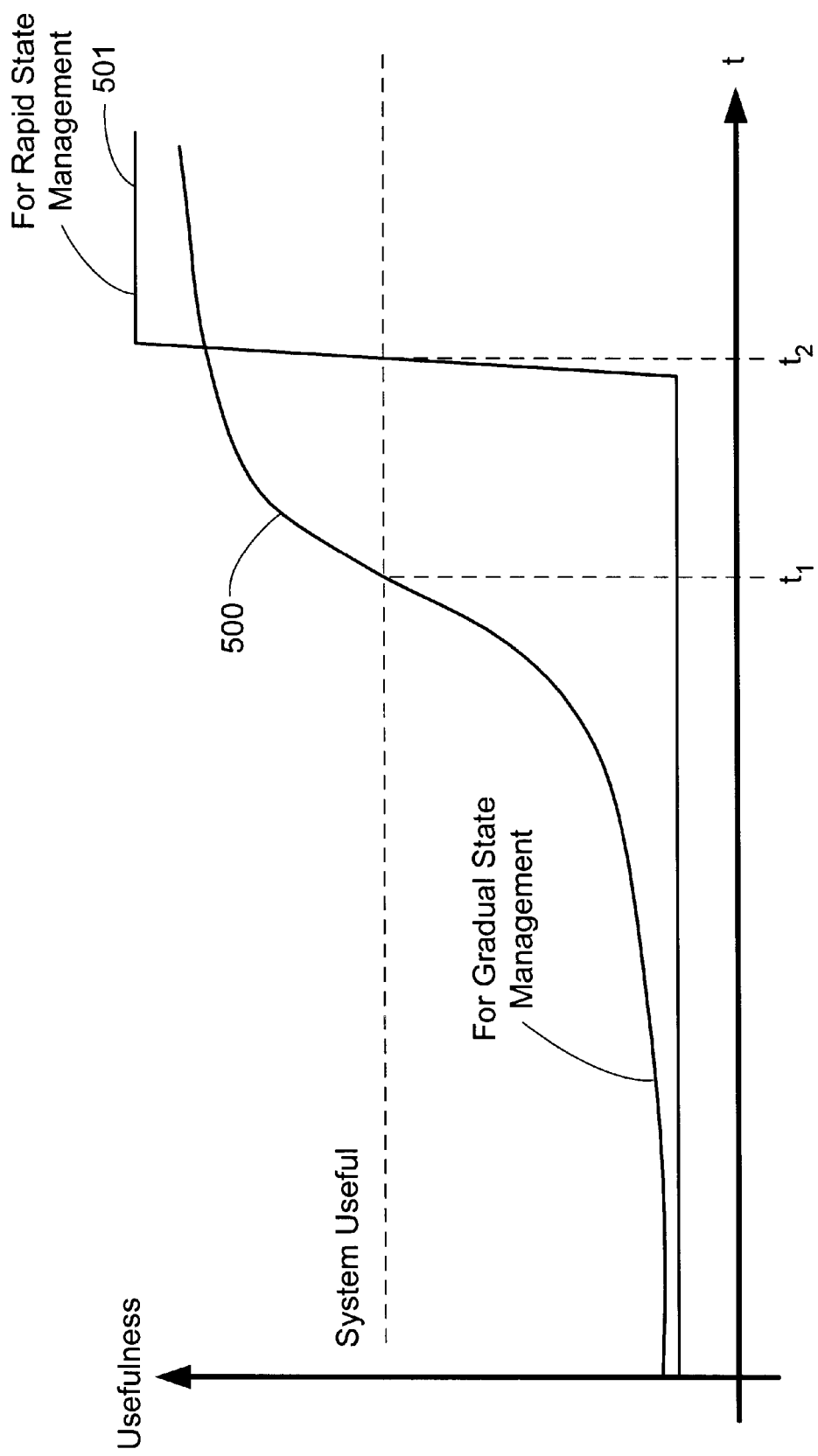
FIG. 11 shows a comparison chart between the gradual state management by the configuration system of FIG. 1 and the rigid state management of a prior art configuration system.

FIG. 11 shows the comparison between the gradual state management by the configuration system 10 of FIG. 1 and the rigid state management of a prior art configuration system for moving a component-based application system (e.g., the application 13 of FIG. 1) into a desired state. As can be seen from FIG. 11, the curve 500 indicates the gradual state management performed by the configuration system of FIG. 1 and the curve 501 indicates the prior art rigid state management. The curve 501 shows basically a binary state transition of the application system while the curve 500 shows a gradual state transition. In addition, curve 500 shows that the application system becomes useful under the gradual state transition of the configuration system 10 much earlier (i.e., at $t_1$, time) than using the prior art rigid state transition approach (i.e., at $t_2$ time). This is especially true when the application system can be useful when only partially running.

In the foregoing specification, the invention has been described with reference to specific embodiments thereof. It will, however, be evident to those skilled in the art that various modifications and changes may be made thereto without departing from the broader spirit and scope of the invention. The specification and drawings are, accordingly, to be regarded in an illustrative rather than a restrictive sense.

What is claimed is:

1. A configuration system for an application having a plurality of application components, comprising:
   (A) a configuration initiator that repeatedly asserts a desired state to the application components to operate in the desired state, wherein the configuration initiator only asserts the desired state to the application components and does not control the manner in which each of the application components to move to the desired state;
   (B) a configuration engine in each of the application components that causes the corresponding application component to move to the desired state without any external control from the configuration initiator unless the configuration engine determines that the corresponding application component is already in the desired state.

2. The configuration system of claim 1, further comprising a configuration information store that stores the configuration information needed for each of the application components to move to the desired state in accordance with state assertion of the desired state from the configuration initiator.

3. The configuration system of claim 2, wherein the configuration information store further comprises a plurality of identical storage replicas, each storing identical data of the configuration information store.

4. The configuration system of claim 2, wherein the configuration system further comprises an access balancing module in each of the application components that generates a random delay for the corresponding application component to access the configuration information store such that the information store is not overwhelmed by the accesses from the application components.

5. The configuration system of claim 3, wherein the configuration system further comprises an access balancing module in each of the application components that randomly selects one of the storage replicas for access by the corresponding application component in response to the desired state such that none of the replicas is overwhelmed by the accesses from the application components.

6. The configuration system of claim 1, wherein the configuration engine in an application component ignores the desired state if the configuration engine determines that the corresponding application component is already in the predetermined state upon receiving the desired state.

7. The configuration system of claim 1, wherein configuration initiator does not receive any reply from the application components regarding the state transition to the predetermined state when repeatedly asserting the desired state to the application components such that the application components are asymptotically configured to the predetermined state.

8. The configuration system of claim 2, wherein the configuration information store further comprises a plurality of storage replicas and the configuration information for each of the application components is stored in one of the replicas such that accesses to the information store are distributed among the replicas.

9. The configuration system of claim 8, wherein the configuration system further comprises an access balancing module in each of the application components that accesses the replica associated with the corresponding application component in response to the desired state such that none of the replicas is overwhelmed by the accesses from the application components.

10. The configuration system of claim 1, further comprising a publish/subscribe channel coupled between the configuration initiator and the application components to allow the configuration initiator to repeatedly assert the desired state to the application components.

11. A method of configuring a plurality of application components of an application, comprising the steps of:
    (A) repeatedly asserting a desired state to the application components to operate in the desired state, and yet not controlling the manner in which each of the application components moves to the desired state;
    (B) using a configuration engine in each of the application components to cause the corresponding application components to move to the desired state upon receiving the desired state unless the configuration engine determines that the corresponding application component is already in the desired state.

12. The method of claim 11, wherein the step (A) is performed without requiring any reply from the application components regarding the state transition to the desired state such that the application components are asymptotically and automatically configured to the desired state.

13. The method of claim 11, wherein the desired state is communicated to the application components via a publish/subscribe channel coupled between the configuration initiator and the application components.

14. The method of claim 11, wherein the step (B) further comprises the step of ignoring the desired state if the configuration engine determines that the corresponding application component is already in the desired state.

15. The method of claim 11, wherein the step (B) further comprises the step of accessing a configuration information store that stores the configuration information needed for each of the application components to move to the desired state.

16. The method of claim 15, wherein the step of accessing the configuration information store further comprises the step of generating a random delay for each of the application components to access the configuration information store such that the information store is not overwhelmed by the accesses from the application components.

17. The method of claim 15, wherein the configuration information store further comprises a plurality of identical storage replicas, each storing identical data of the configuration information store, wherein the step of accessing the configuration information store further comprises the step of randomly selecting one of the storage replicas for access by each of the application components in response to the desired state such that none of the replicas is overwhelmed by the accesses from the application components.

18. The method of claim 15, wherein the configuration information store further comprises a plurality of storage replicas and the configuration information for each of the application components is stored in one of the replicas such that accesses to the information store is distributed among the replicas.

19. A method of balancing accesses to an information store by a plurality of application components of an application, comprising the steps of:

proviidng a plurality of storage replicas for the information store, each storing the same set of data of the information store;

generating a random delay for each of the application components to access the information store and randomly selecting each of the application components to access one of the replicas of the information store such that none of the replicas is overwhelmed by the accesses from the application components.

20. The method of claim 19, wherein the random delay is a bounded random delay for each of the application components.

* * * * *